(12) United States Patent
Holzer et al.

(10) Patent No.: US 10,628,675 B2
(45) Date of Patent: Apr. 21, 2020

(54) SKELETON DETECTION AND TRACKING VIA CLIENT-SERVER COMMUNICATION

(71) Applicant: Fyusion, Inc., San Francisco, CA (US)

(72) Inventors: Stefan Johannes Josef Holzer, San Mateo, CA (US); Matteo Munaro, San Francisco, CA (US); Abhishek Kar, Berkeley, CA (US); Alexander Jay Bruen Trevor, San Francisco, CA (US); Krunal Ketan Chande, San Francisco, CA (US); Radu Bogdan Rusu, San Francisco, CA (US)

(73) Assignee: Fyusion, Inc., San Francisco, CA (US)

( * ) Notice: Subject to any disclaimer, the term of this patent is extended or adjusted under 35 U.S.C. 154(b) by 7 days.

(21) Appl. No.: 15/427,026

(22) Filed: Feb. 7, 2017

(65) Prior Publication Data

US 2018/0225517 A1    Aug. 9, 2018

(51) Int. Cl.
*G06K 9/00* (2006.01)
*H04L 29/06* (2006.01)
(Continued)

(52) U.S. Cl.
CPC ..... *G06K 9/00718* (2013.01); *G06K 9/00671* (2013.01); *G06K 9/00979* (2013.01); *G06K 9/22* (2013.01); *G06K 9/6201* (2013.01); *G06T 7/246* (2017.01); *G06T 7/73* (2017.01); *H04L 65/4069* (2013.01); *H04L 65/601* (2013.01); *H04N 21/2187* (2013.01); *H04N 21/4223* (2013.01);
(Continued)

(58) Field of Classification Search
None
See application file for complete search history.

(56) References Cited

U.S. PATENT DOCUMENTS

| 8,230,367 B2 * | 7/2012 | Bell | G06F 3/011 |
| | | | 715/863 |
| 8,724,887 B2 * | 5/2014 | Masalkar | G06F 3/005 |
| | | | 382/154 |

(Continued)

FOREIGN PATENT DOCUMENTS

WO    2015073570 A2    5/2015

OTHER PUBLICATIONS

Chen, Shenchang E., "QuickTime VR—An Image-Based Approach to Virtual Environment Navigation", ACM, SIGGRAPH '95 Proceedings of the 22nd annual conference on Computer graphics and interactive techniques, 1995, 29-38.

(Continued)

*Primary Examiner* — Vikkram Bali
(74) *Attorney, Agent, or Firm* — Kwan & Olynick LLP

(57) ABSTRACT

Provided are mechanisms and processes for performing skeleton detection and tracking via client-server communication. In one example, a server transmits a skeleton detection message that includes position data for a skeleton representing the structure of an object depicted in a first video frame in a raw video stream at a client device. Based on the initial position data, a processor identifies intervening position data for the skeleton in one or more intervening video frames that are temporally located after the first video frame in the raw video stream. A filtered video stream is then presented by altering the raw video stream based at least in part on the first position data and the intervening position data.

17 Claims, 11 Drawing Sheets

(51) Int. Cl.
H04N 21/435 (2011.01)
H04N 21/44 (2011.01)
H04N 21/4545 (2011.01)
H04N 21/2187 (2011.01)
H04N 21/4223 (2011.01)
G06K 9/62 (2006.01)
G06T 7/246 (2017.01)
G06T 7/73 (2017.01)
G06K 9/22 (2006.01)
G06K 9/32 (2006.01)

(52) U.S. Cl.
CPC ..... *H04N 21/435* (2013.01); *H04N 21/44008* (2013.01); *H04N 21/4545* (2013.01); *G06K 2009/3291* (2013.01); *G06T 2207/10016* (2013.01); *G06T 2207/10024* (2013.01); *G06T 2207/30172* (2013.01)

(56) References Cited

U.S. PATENT DOCUMENTS

| | | | |
|---|---|---|---|
| 2004/0114825 A1* | 6/2004 | Wu | G01S 3/7864 382/261 |
| 2006/0188147 A1 | 8/2006 | Rai et al. | |
| 2010/0171691 A1 | 7/2010 | Cook et al. | |
| 2011/0254835 A1 | 10/2011 | Segal | |
| 2012/0243732 A1 | 9/2012 | Swaminathan et al. | |
| 2012/0309516 A1* | 12/2012 | Langridge | G06K 9/00355 463/31 |
| 2013/0155180 A1 | 6/2013 | Wantland et al. | |
| 2013/0162634 A1 | 6/2013 | Baik | |
| 2013/0250045 A1 | 9/2013 | Ki et al. | |
| 2013/0343727 A1 | 12/2013 | Rav-Acha et al. | |
| 2014/0247279 A1* | 9/2014 | Nicholas | G06T 19/006 345/633 |
| 2015/0130800 A1 | 5/2015 | Holzer et al. | |
| 2015/0130894 A1 | 5/2015 | Holzer et al. | |
| 2015/0134651 A1 | 5/2015 | Holzer et al. | |
| 2015/0138190 A1 | 5/2015 | Holzer et al. | |
| 2015/0339846 A1 | 11/2015 | Holzer et al. | |
| 2017/0109930 A1* | 4/2017 | Holzer | G06T 13/20 |

OTHER PUBLICATIONS

Clare, Adam, "Reality is a Game; What is Skybox?", retrieved from the Internet <http://www.realityisagame.com/archives/1776/what-is-a-skybox/>, 5.

Golovinskly, Aleksey et al., "Shape-based Recognition of 3D Point Clouds in Urban Environment", IEEE, IEEE 12th International Conference on Computer Vision (ICCV), 2009, 2154-2161.

Gurdan, Tobias et al., "Spatial and Temporal Interpolation of Multi-View Image Sequences", Department of Computer Science, Technische Universitat Munchen Ascending Technologies GmbH, Krailing, Germany, Section 2.3, Image Warping and Blending; Retrieved from the Internet <https://vision.in.tum.de/_media/spezial/bib/gurdan-et-al-gcpr-2014.pdf>, 12.

Mian, Ajmal S. et al., "Three-Dimensional Model-Based Object Recognition and Segmentation in Cluttered Scenes", IEEE Transactions on Pattern Analysis and Machine Intelligence, Col. 28, No. 10, Oct. 2006, 1584-1601.

Saito, Hideo et al., "View Interpolation of Multiple Cameras Based on Projective Geometry", Department of Information and Computer Science, Keio University and Presto, Japan Science and Technology Corporation (JST), retrieved from the Internet <http://citeseerx.ist.psu.edu/viewdoc/download?doi=10.1.1.6.5162&rep=rep1&type=pdf>, 6.

Schiller, Ingo et al., "Datastructure for Capturing Dynamic Scenes with a Time-of-Flight Camera", Springer-Verlad, Dyna3D 2009, LNCS 5742, 2009, 42-57.

Seitz, Steven M., "Image-Based Transformation of Viewpoint and Scene Appearance", A Dissertation submitted in partial fulfillment of the requirements for the Degree of Doctor of Philosophy at the University of Wisconsin; retrieved from the Internet <http://homes.cs.washington.edu/~seitz/papers/thesis.pdf>, 1997, 111.

Snavely, Noah et al., "Photo Tourism: Exploring Phot Collections in 3D", ACM, ACM Transactions on Graphics (TOG)—Proceeding of ACM SIGGRAPH 2006, vol. 25, Issue 3, Jul. 2006, 835-846.

Steder, Bastian et al., "Robust On-line Model-based Object Detection from Range Images", International Conference on Intelligent Robots and Systems, pp. 4739-4744, Oct. 15, 2009, 6 pages.

Bruce D. Lucas and Takeo Kanade, "An Iterative Image Registration Technique with an Application to Stereo Vision," International Joint Conference on Artificial Intelligence, pp. 674-679, 1981 https://ri.cmu.edu/pub_files/pub3/lucas_bruce_d_1981_2/lucas_bruce_d_1981_2.pdf.

Gammeter, S., Gassmann, A., Bossard, L., Quack, T., & Van Gool, L. (Jun. 2010). Server-side object recognition and client-side object tracking for mobile augmented reality. In 2010 IEEE Computer Society Conference on Computer Vision and Pattern Recognition-Workshops (pp. 1-8). IEEE. http://homes.esat.kuleuven.be/~konijn/publications/2010/eth_biwi_00782.pdf.

Jung, J., Ha, J., Lee, S. W., Rojas, F. A., & Yang, H. S. (2012). Efficient mobile AR technology using scalable recognition and tracking based on server-client model. Computers & Graphics, 36(3), 131-139. http://citeseerx.ist.psu.edu/viewdoc/download?doi=10.1.1.406.9254&rep=rep1&type=pdf.

* cited by examiner

SKELETON DETECTION AND TRACKING VIA CLIENT-SERVER COMMUNICATION

TECHNICAL FIELD

The present disclosure relates to the detection and tracking of skeletons via client-server communication, and in particular to the detection and tracking of skeletons in live video streams.

DESCRIPTION OF RELATED ART

Skeleton identification is a key component in many video processing tasks. For instance, to determine if a person is exhibiting a particular static pose or moving in a particular fashion, the person may be abstracted into a skeleton having a body, head, and limbs. However, skeleton detection is challenging because people can assume very different poses that can result in very different appearance in the image. Also, self-occlusions or occlusions with other people or objects can hide some joints. Thus, conventional algorithms for skeleton detection are not fast enough to run in real-time on a mobile computing device.

Skeleton detection may also be used in visual filtering. Images captured by cameras are commonly modified by applying visual filters. For example, a visual filter may sharpen, blur, or emboss an image to introduce a desired visual effect. Applying a filter to an image can in some cases require a considerable amount of computing resources. However, because an image is static, mobile computing devices such as mobile phones are often capable of performing static image filtering. Filters can also be applied to moving images. For instance, video footage can be sharpened, blurred, or embossed in the same way as a static image. However, filtering video footage typically requires substantial computing resources. Although a mobile computing device may be able to perform simple video filtering, applying complex filtering operations based on skeleton detection to live video streams is well beyond the computing capabilities of mobile computing devices.

Accordingly, it is desirable to develop improved mechanisms and processes relating to skeleton detection and tracking in video streams on mobile devices. Such improved mechanisms and processes can facilitate the application of filters to either live video streams or pre-recorded video streams. In addition, such improved mechanisms and filters would allow the recognition of poses and gestures in live video streams or pre-recorded video streams.

Overview

Provided are various mechanisms and processes relating to performing skeleton detection and tracking of camera views and other media streams using client-server communication. In one aspect, which may include at least a portion of the subject matter of any of the preceding and/or following examples and aspects, a process implemented at a client device and/or embodied in a computer readable media includes receiving from a remote server via a network interface at a client device a first skeleton detection message that includes first position data for a skeleton representing the structure of an object depicted in a first video frame in a raw video stream at the client device. Based on the first position data, a processor at the client device identifies intervening position data for the skeleton in one or more intervening video frames in the raw video stream, where the one or more intervening video frames are temporally located after the first video frame in the raw video stream. A filtered video stream is then presented by altering the raw video stream based at least in part on the first position data and the intervening position data.

In another aspect, which may include at least a portion of the subject matter of any of the preceding and/or following examples and aspects, a second skeleton detection message may be received from the remote server. The second skeleton detection message includes second position data for the skeleton representing the structure of the object depicted in a second video frame in the raw video stream, where the second video frame is temporally located after the one or more intervening video frames. The procedure may also involve identifying pose information associated with the object based on the first position data or the intervening position data, wherein the pose information indicates a stance or positioning of the object, where the raw video stream is altered based at least in part on the pose information.

In yet another aspect, which may include at least a portion of the subject matter of any of the preceding and/or following examples and aspects, the object may be a human, an animal, or a vehicle. Altering the raw video stream may include introducing a text bubble appearing in proximity to a human face, introducing an artificial item into the filtered video stream, or introducing motion blur indicating movement associated with the object. The filtered video stream may be presented live at the client device, and the raw video stream may be a camera view associated with a camera operating at the client device. Alternately, the filtered video stream may be presented at an augmented reality or virtual reality device in communication with the client device.

In still another aspect, which may include at least a portion of the subject matter of any of the preceding and/or following examples and aspects, the raw video stream may include a surround view of the object, where the surround view of the object includes spatial information, scale information, and a plurality of different viewpoint images of the object. Alternately, or additionally, the raw video stream may include spatial information selected from the group consisting of: depth information, visual flow between a plurality of viewpoints, and three-dimensional location information. As another example, the raw video stream may include scale information estimated using accelerometer information or inertial measurement unit (IMU) data.

These and other embodiments are described further below with reference to the figures.

BRIEF DESCRIPTION OF THE DRAWINGS

The disclosure may best be understood by reference to the following description taken in conjunction with the accompanying drawings, which illustrate particular embodiments of the present invention.

DETAILED DESCRIPTION

Figure 1:
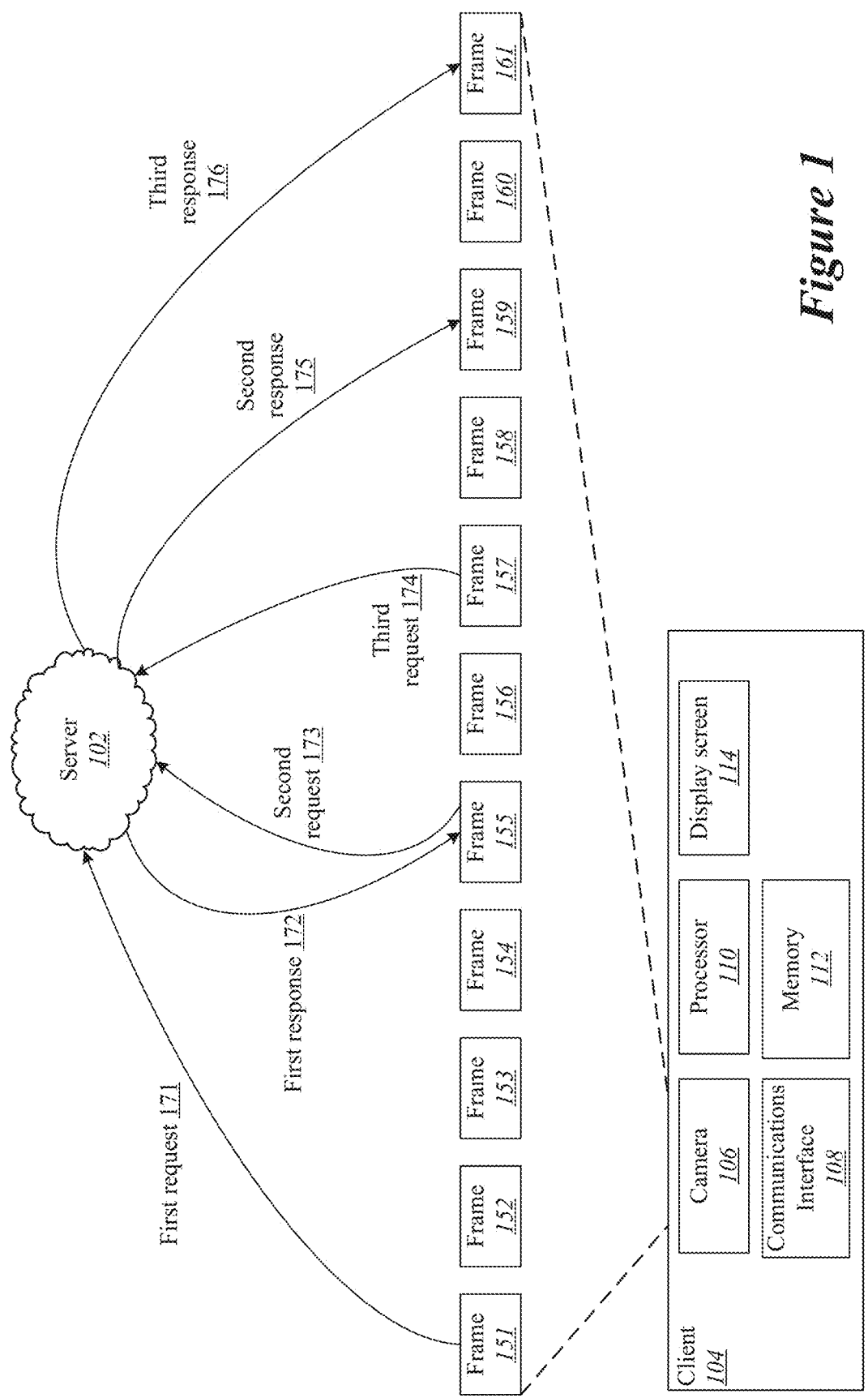
FIG. 1 illustrates one example of a system that can be used to perform a live skeleton tracking in a video stream.

Reference will now be made in detail to some specific examples of the present disclosure including the best modes contemplated by the inventors for carrying out the present disclosure. Examples of these specific embodiments are illustrated in the accompanying drawings. While the present disclosure is described in conjunction with these specific embodiments, it will be understood that it is not intended to limit the present disclosure to the described embodiments. On the contrary, it is intended to cover alternatives, modifications, and equivalents as may be included within the spirit and scope of the present disclosure as defined by the appended claims.

In the following description, numerous specific details are set forth in order to provide a thorough understanding of the present invention. Particular example embodiments of the present invention may be implemented without some or all of these specific details. In other instances, well known process operations have not been described in detail in order not to unnecessarily obscure the present invention.

Various techniques and mechanisms of the present invention will sometimes be described in singular form for clarity. However, it should be noted that some embodiments include multiple iterations of a technique or multiple instantiations of a mechanism unless noted otherwise. For example, a system uses a processor in a variety of contexts. However, it will be appreciated that a system can use multiple processors while remaining within the scope of the present invention unless otherwise noted. Furthermore, the techniques and mechanisms of the present invention will sometimes describe a connection between two entities. It should be noted that a connection between two entities does not necessarily mean a direct, unimpeded connection, as a variety of other entities may reside between the two entities. For example, a processor may be connected to memory, but it will be appreciated that a variety of bridges and controllers may reside between the processor and memory. Consequently, a connection does not necessarily mean a direct, unimpeded connection unless otherwise noted.

According to various embodiments, techniques and mechanisms described herein allow for the detection of articulated movements of people or other objects in real-time during capturing images from a mobile device. In one example, the position of a set of human joints is identified for every frame. A combination of client and server applications may be used to obtain skeleton information about a scene. While a user points the camera onto a scene, visual data as well as potentially other information (such as inertial measurement unit (IMU) data, global position system (GPS) location, etc.) are sent from the client application to a server application. The server application uses the data to detect a skeleton in the current frame. This information is then sent from the server back to the client where it is used to guide skeleton tracking over successive frames. While the user keeps pointing the camera at the scene, more data can be sent which can be used by the server to update the obtained information about the already observed scene and to also obtain information about scene parts which were not captured previously. This updated information is then sent back to the client application.

According to various embodiments because the communication between the client device and the server coupled with the processing time at the server may involve more latency than the time between successive video frames, the video stream at the client machine may have progressed to a different frame by the time the filter processing message has been received. Further, even when latency is sufficiently low to allow processing every frame at the server, for instance when the server and client are implemented on the same physical device, skeleton detection may still be performed sparsely to reduce processing load, improve battery usage, or freeing resources for other tasks. In one example, potentially many intervening video frames are presented between when the video frame is transmitted from the client device to the server and when the skeleton detection message is received at the client device from the server. Thus, the client device performs client-side processing of each video frame in order to track the skeleton across successive frames in addition to relying upon skeleton detection information provided by the server.

Although many of the mechanisms and techniques described herein are described with respect to human skeleton tracking, these mechanisms and techniques are generally application to tracking other types of skeletons, including skeletons associated with animals or inanimate objects. Such objects may be articulable, such as would be the case with a bendable toy, or rigid, such as would be the case with a vehicle. Skeleton identification and tracking for rigid objects may facilitate various types of operations such as pose detection (e.g., identifying in which direction a vehicle is facing) or object recognition (e.g., different cars may be associated with different rigid skeletons).

In some implementations, skeleton detection and/or tracking may be used to perform segmentation at the client device or the server in order to divide an object or a scene into constituent components, which may be used in part to provide filters when objects are partially or wholly occluded from view in an image frame. For instance, the skeleton of an object may be estimated when part of the object moves behind some intervening object.

According to various embodiments, skeleton detection may be used for any of various purposes. In one example, skeleton detection may be used to trigger a filter. For instance, skeleton detection may be used to determine if a person is exhibiting a particular pose, such as pumping a first in the air. If such a pose is detected, then the video stream may be altered to depict lightning extending from the fist. In another example, skeleton detection may be used to trigger a photo to be captured. For instance, a person may position a camera to take a self-image and then move in front of the camera. The camera may then capture an image when it identifies the person's skeleton and determines that the person has stopped moving or has entered into a particular pose, such as jumping in the air.

The mechanisms and processes described in this disclosure provide improvements over skeleton detection and tracking approaches. For example, conventional video filtering approaches at a client device are limited by the computing power of the client device, which is typically much more restricted than the computing power of a server. Thus, techniques and mechanisms described herein expand the capabilities of the client device by allowing the client device to provide sophisticated skeleton detection for live video streams.

In particular embodiments, the techniques and mechanisms described herein may be used in conjunction with video filtering. For example, a filter may be applied to a live video stream such as a camera view captured at the client device. In some cases, a filter may be applied based on a detected and tracked skeleton. For instance, a filter may be applied that artificially inserts a hat onto a person's head in a video stream, where the hat continues to stay with the person's head even as the person moves and changes positions.

In particular embodiments, video filtering is provided through a client-server communication system. During this process, a video frame is transmitted from the client device to the server. The server processes the video frame to produce filtering information and then transmits a filter processing message to the client device that indicates how to apply a filter to the video frame. The client device then applies the filtering information to create a filtered video stream. Filters modify and/or add to the visual data of a media object such as a live video stream or a multi-view interactive digital media representation. One example for a modification is a change to the color matrix, such as darkening the colors associated with a video stream. Examples of additions include, but are not limited to, adding 2D or 3D stickers or text that is placed relative to a reference coordinate system. For instance, a thought bubble may be placed near to a person's head and continue to stay with the person as the person moves. Given information about the content of the scene, scene elements can be used as reference coordinate system for filters, as masks to apply filters only to certain parts of the scene or to act as occluder for a filter, and for other such purposes. Although the computing capabilities of mobile devices increase over time, their computational power is still a limiting factor for advanced algorithms that allow to obtain detailed information about the content of a scene.

With reference to FIG. 1, shown is one example of a system that can be used to perform a live video stream filtering. As depicted, a combination of client and server applications is used to implement a filtering mechanism that runs live in a capture device application, such as with a camera on a smartphone. While the camera is recording, the user points the camera at an object. The smartphone then communicates with the server, and collectively the two devices analyze the video stream to provide a filtered view of the video stream in real time.

In the present embodiment, the client is depicted as device 104, which can be a capture device such as a digital camera, smartphone, mobile device, etc. The server is depicted as system 102, which receives images selected from the video stream at the client device. The video stream at the client device is divided into video frames 151 through 161. The server processes the frames sent from the client device and response with skeleton detection information that can be used track the skeleton in the video stream at the client device. The client device includes a camera 106 for capturing a video stream, a communications interface 108 capable of communicating with the server, a processor 110, memory 112, and a display screen 114 on which the video stream may be presented.

According to various embodiments, the client and server may coordinate to perform skeleton detection and tracking at least in part due to limited computing resources at the client machine. However, as discussed herein, the network latency and processing time involved in transmitting video frames to the server means that the video stream at the client device has progressed to a new video frame before receiving the filter processing message from the server with the filter information associated with the preceding frame. For instance, in FIG. 1, the first request 171 transmits the frame 151 to the server, while the first response 172 corresponding to the frame 151 arrives while the frame 155 is being processed. Similarly, the second request 173 and third request 174 transmit frames 155 and 157 respectively, but the corresponding second and third responses 175 and 176 are not received until the video stream has arrived at frames 159 and 161 respectively.

In some implementations, the client application sends (and also receives) data in a sparse manner, meaning that data is sent to the server potentially not for all frames captured by the camera. Therefore, in order to track a skeleton in a live stream, the information received from the server is tracked or propagated to new frames received from the camera until new information from the server is available. For example, in FIG. 1, the client device may propagate information received in the first response 172 through frames 156, 157, and 158 until the second response 175 is received for the processing of frame 159.

Figure 2:
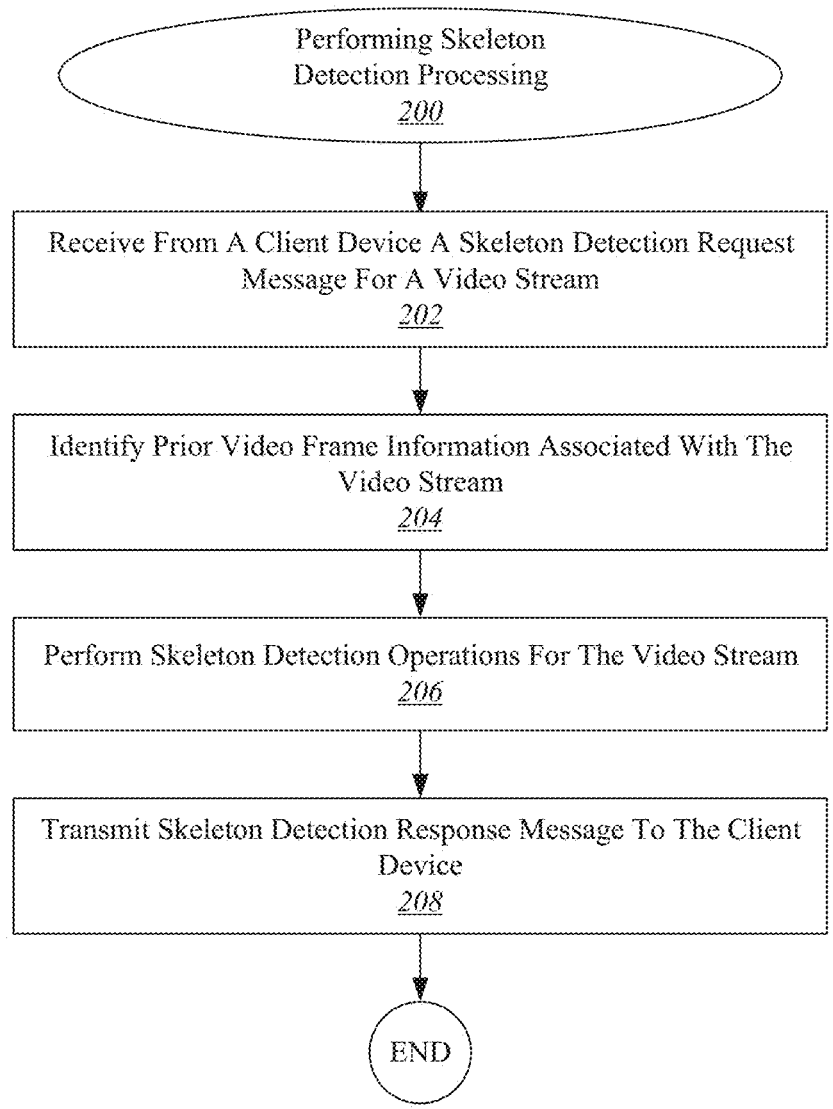
FIG. 2 illustrates one example of a process for performing skeleton detection in a video stream.

With reference to FIG. 2, shown is one example of a configuration for performing skeleton detection processing. In some implementations, the procedure 200 may be performed in order to perform server-side processing to facilitate skeleton tracking in a media stream at a client device. The procedure 200 may be initiated at 202 when a skeleton detection request message for a video stream is received from a client device. According to various embodiments, as discussed with respect to FIGS. 1 and 3, a variety of information may be included in a skeleton detection request message. For instance, the request message may include the identity of the client device as well as any information necessary for performing skeleton detection, such as image data information associated with one or more video stream frames, IMU information, or GPS information. In particular embodiments, the client device may perform one or more preprocessing operations, for instance to reduce bandwidth usage. For example, the client device may determine a bounding box for a feature such as a skeleton and/or transmit only a part of an image that includes a particular feature.

In particular embodiments, after receiving the request message, at 204 the server may identify information associated with one or more prior video frames in the video stream. For example, the prior video frame information may include any raw data transmitted from the client device in early live filtering request messages. Alternately, or additionally, the prior video frame information may include processed or filtered data generated by processing previous live filtering request messages.

Then, at 206 the server performs skeleton detection operations for the video stream. According to various embodiments, skeleton detection operations may be performed using any of various suitable methods. In one example, a convolutional neural network may be applied to an image to first detect all objects in the scene and then estimate the skeleton joints for those that belong to the "person" category. In a second example, static skeleton detection at the server may be combined with server-side skeleton detection and/or tracking across prior frames. For instance, the results of one or more skeleton detection operations for previous skeleton detection messages may be analyzed to aid in the detection of a skeleton for the current frame. In a third example, non-visual data such as accelerometer or gyroscopic data may be analyzed to aid in skeleton detection.

After performing skeleton detection operations, at 208 a skeleton detection response message is transmitted to the client device. According to various embodiments, the skeleton detection response message may include any information for identifying and tracking the skeleton at the client device. For example, the response message may include coordinates identifying the location of skeleton joints in a particular image frame. As another example, the response message may include semantic information indicating points that correspond with particular skeletal features such as elbows, shoulders, or faces. As yet another example, the skeleton detection response message may include bounding box information that identifies a general location of a feature, which the client device may use to locate the feature more specifically. As still another example, the skeleton detection response message may include guidance information to the client device and/or user. For instance, the message may indicate that detection quality is poor because parts of the object are occluded or the object is viewed from a suboptimal angle. Alternately, or additionally, the message may indicate that the user could move to a different position to resolve an occlusion or improve a viewing angle.

Figure 3:
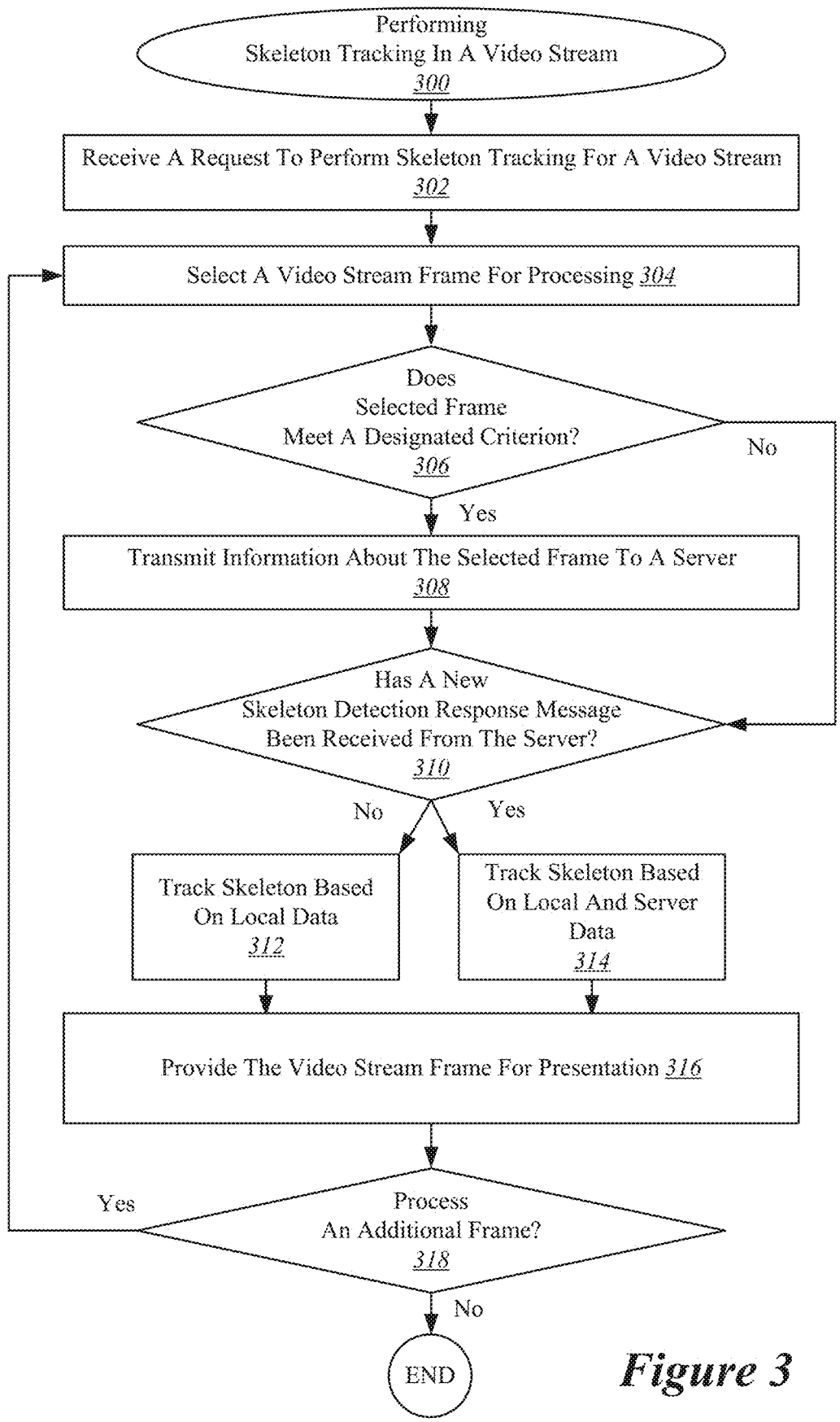
FIG. 3 illustrates one example of a process for performing skeleton tracking in a video stream.

With reference to FIG. 3, shown is one example of a process for performing skeleton tracking in a video stream. According to various embodiments, the process shown in FIG. 3 may be performed at a client machine in communication with a server, such as the client machine 104 in communication with the server 102 shown in FIG. 1. The two devices may coordinate to split the processing operations required to perform skeleton detection and tracking in a live video stream.

In the present example, a skeleton tracking process 300 begins with the client device receiving a request to perform skeleton tracking in a video stream at 302. In some implementations, the request may be generated based on user input requesting skeleton tracking. Alternately, the request may be generated automatically when the client device detects that a video stream is being captured or displayed at the client device. Next, the system select a video stream frame for processing at 304. According to various embodiments, video stream frames may be processed sequentially. For instance, each frame in a live video stream may be processed prior to presenting the video stream to the user so that a filter may be applied or a determination may be made based on the skeleton tracking.

At 306, a determination is made as to whether the selected video stream frame meets a designated criterion. In some implementations, any of a variety of criteria may be used to select a video stream frame for transmission to the server. For example, if the filtering process has just been initiated, then the client device may select the first available video stream frame for processing. As another example, one or more criteria may be applied to select the video stream frame. For instance, the client device may select a video stream frame that exceeds a threshold level of light or detail to allow for sufficient information for applying a filter. As yet another example, the client device may select a video stream frame for processing after a designated period of time or number of frames have passed since the last video stream frame was transmitted to the server.

If the selected frame meets the designated criterion, then information about the selected frame is transmitted to the server at 308. According to various embodiments, a variety of information may be transmitted to the server. In one example, some or all of the image data associated with the frame may be transmitted. For instance, the entire frame may be transmitted. Alternately, the frame may be compressed or down sampled to reduce bandwidth usage. In a second example, IMU information such as gyroscopic data, compass data, or accelerometer data may be transmitted. This IMU information may provide data about the position, velocity, acceleration, direction, rotation, or other such characteristics of the device around the time that the frame was captured. In a third example, GPS information may be transmitted. In some implementations, the specific information transmitted to the server may depend on the type of processing being performed at the server and/or the type of filter being applied at the client device.

Next, a determination is made at 310 as to whether a new skeleton detection response message has been received from the server. As shown in FIG. 1, the server sends messages that include information for identifying a skeleton at the client device, but these skeleton detection response messages are sent at a lag when compared with the live processing and presentation of the video stream.

If no new skeleton detection message has been received, then at 312 the skeleton is tracked based on existing data that is locally available at the client machine. In some embodiments, tracking a skeleton based on locally available data may involve propagating information from one frame to another. For instance, a current frame may be analyzed to identify the same feature (e.g., an corner or an area of color indicative of a joint) that was identified in the preceding frame. According to various embodiments, a multitude of approaches can be used track a skeleton from one frame to another. One such approach is frame-to-frame tracking, which can be based on information that may include, but is not limited to: tracking of sparse keypoints, dense or sparse optical flow, patch tracking, tracking of geometric instances, or other such information. Another such approach is frame-to-frame matching, which involve techniques that may include, but are not limited to: descriptor based matching of keypoints which are detected in both frames, patch matching, detection and matching of higher level features (e.g. a human face), or other such techniques. Both approaches can focus the tracking and matching efforts on regions or features of interest if such regions or features are identified.

In some implementations, a special processing cases the time from the first frame that is sent to the server to the frame when the corresponding results are received back from the server. Since there is no server-created scene interpretation available until the results of the first frame are received, the client device may not know which specific information in the scene needs to be propagated. Various approaches are possible for handling this situation. In one example, all or most information in the frame is equally propagated. For instance, keypoints may be distributed over the whole image. In a second example, an efficient method for estimating one or more regions of interest may be applied on the client device. For instance, a bounding box for the region may be computed. Then, the propagation of information may be concentrated on the region or regions of interest. In a third example, matching methods may be applied to directly match the information extracted from the first frame to the frame after which the results from the server are available.

If instead a new skeleton detection message has been received, then at 314 the skeleton is tracked based on both the locally available data and the data provided by the server. According to various embodiments, new information received from the server may be combined with the information propagated from frame to frame. To accomplish this goal, various approaches may be used. In one example, old information may be replaced with new information received from the server. In a second example, old information may be combined with new information in a weighted fashion, for instance based on relative confidence values associated with server results and propagation results.

According to various embodiments, the specific operations performed to track a skeleton may depend in large part upon the specific type of filter being applied. In one example, a caption bubble may be applied to a video of a person when the person exhibits a particular pose. In this first example, the server may perform skeleton detection to facilitate pose estimation while the client device tracks low-level image features such as a point associated with a person's elbow or a surface area that is part of the background. Then, the client device may combine the low-level feature tracking information with the skeleton detection information provided by the server to determine whether the person is positioned in the particular pose. In a second example, a filter may be applied to a vehicle based on its position (e.g., crossing a finish line). In this second example, the server may perform segmentation to identify the segmentation and characteristics of the vehicle, while the client device tracks low-level features such as shapes to propagate the location of the vehicle between communication with the server. In particular embodiments, a pose may be dynamic rather than static. For instance, a pose may include a succession of skeleton arrangements that follow one another. Examples of such poses may include, but are not limited to, hand waving or hand clapping, as indicated by a succession of frames in which a hand or hands moves between different frame areas.

Since humans are not rigid, but articulated objects, specific techniques may be used to track human joints. For example, the skeleton detection information received from the server may be used to select different image points to track from each skeleton limb. The points associated with each limb can then be tracked frame-by-frame, for example with a Lukas Kanade method. An example of such a method is described in "An Iterative Image Registration Technique with an Application to Stereo Vision" by Bruce D. Lucas and Takeo Kanade, published in International Joint Conference on Artificial Intelligence, pages 674-679, 1981. The obtained point motions may then be used to estimate a displacement for every skeleton joint. To account for tracking drifts, some physical constraints can be imposed to the tracked skeleton to limit the displacement of joints or the orientation of limbs. This system can allow the tracking of one or more people in the video since all people can be detected by the server and tracked by the client. New detections from the server can be matched with existing tracks in the client, for example with a global nearest neighbor approach based on the overlap of their bounding boxes.

After skeleton tracking, the tracked frame is provided for presentation at 316. Providing the filtered frame for presentation may involve displaying the filtered frame as part of the video stream on a display screen. In some implementations, providing the video stream frame for presentation may involve applying a filter to the frame based on skeleton tracking. Alternately, or additionally, the video stream frame may be stored to memory and or persistent storage for later playback. In a different example, the video stream frame may be transmitted to a separate device for presentation, such as an augmented reality or virtual reality device in communication with the client device.

Finally, a determination is made at 318 as to whether to process an additional frame. In particular embodiments, the system may continue to process additional frames until one or more criteria are met. These criteria may include, but are not limited to: receiving user input indicating a request to stop skeleton tracking, determining that the video stream has terminated, and determining that the video stream no longer includes a skeleton to be tracked.

In some implementations, skeleton detection may be used to aid in pose detection, which may be performed at the client device or at the server either at a delay or in real time. For instance, pose detection may be performed as part of operations 312, 314, or 206. In pose detection, the detected human skeleton may be used to determine whether the arrangement of the skeleton at a particular point in time matches one or more of a discrete set of human poses. In some implementations, pose detection may be accomplished by first estimating a homography from the skeleton joints that in order to frontalize the skeleton for a bitter pose. Then, pose detection may be performed by analyzing spatial relations of the frontalized joints. Next, a temporal filtering method may be applied to remove spurious detections. In particular embodiments, such techniques may be applied to detect poses for either individuals or for multiple people.

In some embodiments, pose detection may involves scaling or stretching location information associated with the detected skeleton and then comparing the location information with the predetermined location information associated with specific poses, where a high degree of similarity between the detected skeleton information and the predetermined skeleton pose information would indicate a match. When pose detection is used, different poses may trigger different events, such as the application of specific filters to a video stream. Alternately, or additionally, the detection of a specific pose may trigger the recommendation of one or more filters to the user for the user to select. In either case, pose detection may be used to suggest or identify start and/or end times for an effect as well as the type of effect that could be added.

Figure 4:
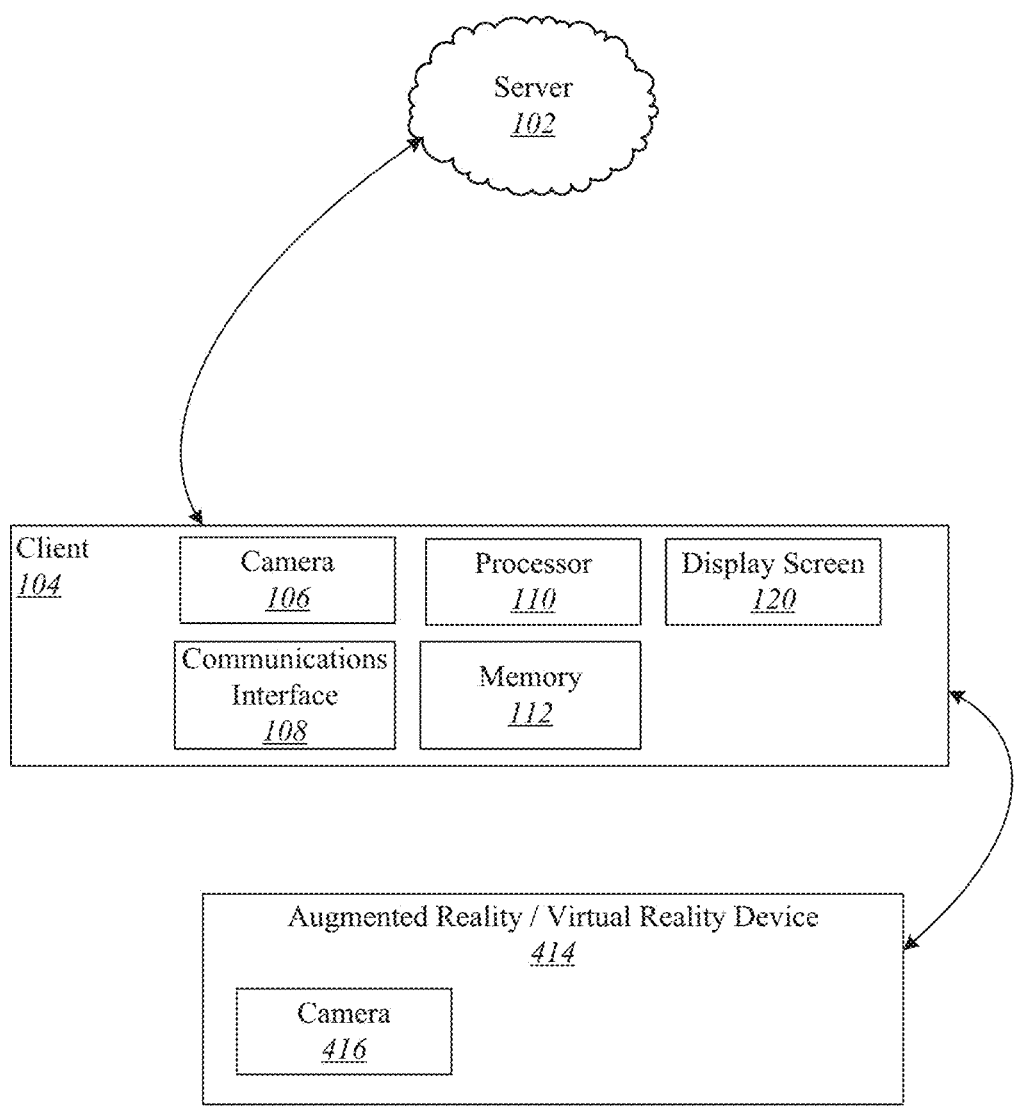
FIG. 4 illustrates one example of a system that can be used to perform a live skeleton tracking in a video stream.

With reference to FIG. 4, shown is one example of a configuration for performing skeleton detection and tracking of a media stream. A media stream may be presented at the client device 104. One or more skeletons in the media stream may be detected and tracked by the client device 104 in communication with the server 102. In particular embodiments, the media stream may be collected at the camera 106. The client device also includes a communications interface 108, a processor 110, memory 112, and a display screen 120.

In some embodiments, the media stream may be presented directly at the client device 104. Alternately, the media stream may be presented at a connected device. For instance, the media presentation may involve an augmented reality or virtual reality media device such as the media device 414 shown in FIG. 4. In virtual reality, the computer-generated simulation of a three-dimensional image or environment can be interacted with in a seemingly real or physical way by a person using special electronic equipment, such as a helmet with a screen inside or gloves fitted with sensors. Augmented reality (AR) is a live direct or indirect view of a physical, real-world environment whose elements are augmented (or supplemented) by computer-generated sensory input such as sound, video, graphics or GPS data.

In some implementations (e.g., augmented reality), the media device 414 may be equipped with a camera 416. The media device 414 may communicate with the client device 104 to present the media experience. For instance, the client device 104, the media device 414, or both may collect user input and/or environmental input data. The client device 104 may also perform processing and/or network communications operations to facilitate the operation of the media device 414. In some implementations, a video stream may be collected by the client device 104 or the media device 414. Then, as discussed herein, information related to the video stream (e.g., video frame image data, IMU data, etc.) may be transmitted to the server 102. The server may then response with one or more messages that include information that may be used to apply a filter to the collected video stream. Then, the client device may combine the received information with locally propagated information to produce the filtered media stream. The filtered media stream may then be presented at the media device 414.

In particular embodiments, the server may directly broadcast information collected by a client device to a different device, such as the media device 414. Alternately, the client and server together may provide information to the media device 414. For instance, the server and client device may coordinate to facilitate the animation of an avatar in augmented reality or virtual reality space, where the avatar would be animated in an augmented reality or virtual reality device other than the client device.

Figure 5:
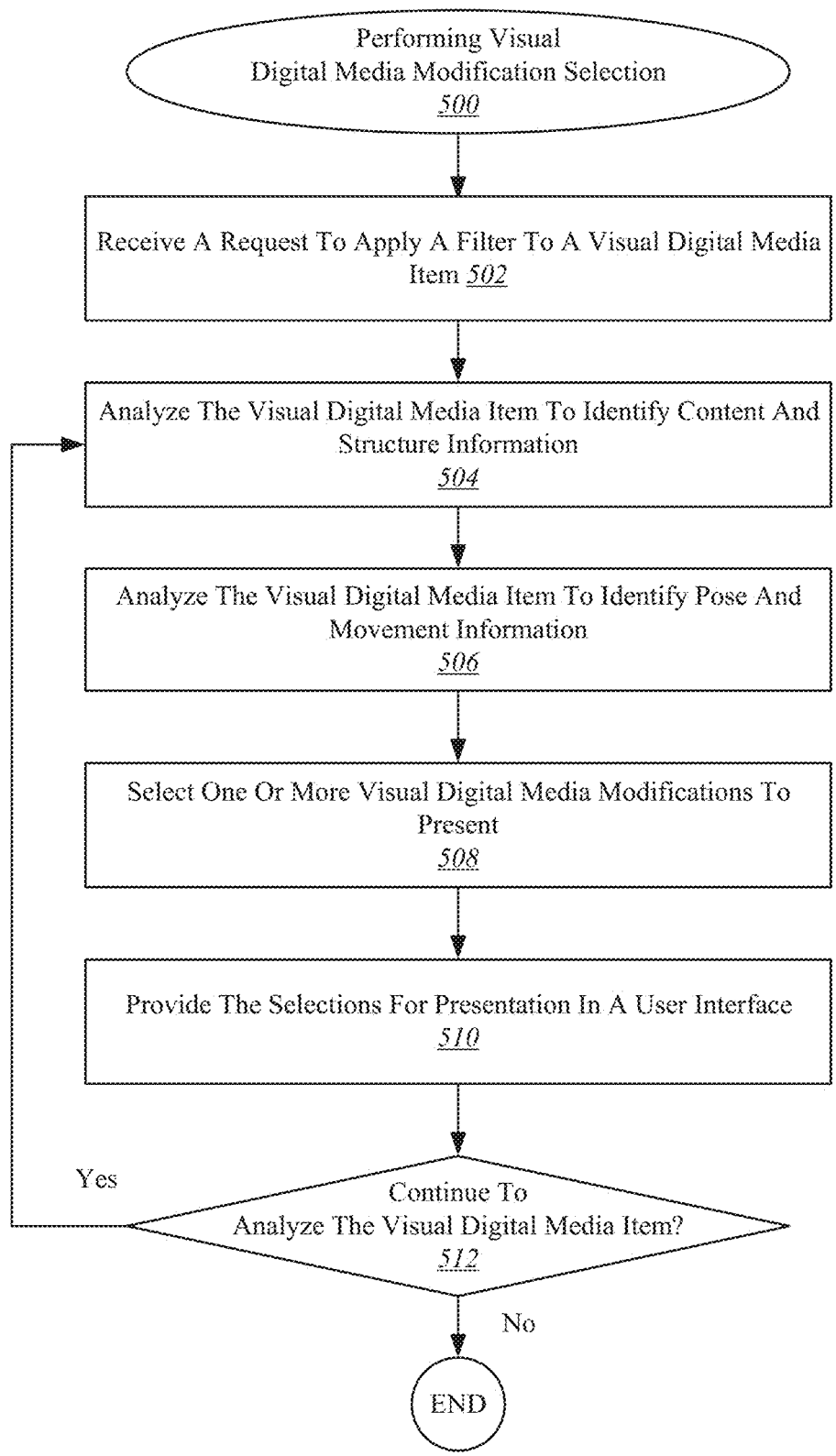
FIG. 5 illustrates one example of a procedure for selecting a digital media modification.

With reference FIG. 5, shown is one example of a process for performing visual digital media modification selection. In some implementations, the process 500 may be performed at a client device. Alternately, the process 500 may be performed at a server. In yet another implementation, some operations shown in the process 500 may be performed at client device while other operations are performed at a server in communication with the client device.

According to various embodiments, the process 500 begins when a request to apply a filter to a visual digital media item is received at 502. The request may be received when a user specifically requests to apply a filter to a visual digital media item. Alternately, the request may be generated automatically when triggered by a particular action such as the activation of a camera at a client device.

Next, at 504, the visual digital media item is analyzed to identify content and structure information. According to various embodiments, content information may include any indication of objects represented in the visual digital media item. For instance, the identified content may include a human being, an animal, a plant, text, an inanimate object such as a vehicle, or an abstract shape such as a ball. Structure information may include a ground plane or a wall. Semantic areas such as sky, grass, and water may also be identified.

Then, at 506, the visual digital media item is analyzed to identify pose and movement information. In some implementations, pose information may indicate an attitude or position of an identified object. For example, if a human being is identified as being represented in the visual digital media item via skeleton detection, then pose information may indicate whether the human being is sitting, standing, walking, or arranged in some other posture. Pose information may also be applied to other types of objects. For instance, pose information may indicate the position of a vehicle relative to the viewer, the stance of an animal, the attitude or position of a deformable inanimate object, or other such positioning information. Movement information may indicate the velocity or acceleration of an identified object. The movement may be identified relative to scene structure, another object, the viewpoint, or any other reference plane or point.

A variety of techniques may be used to identify content, structure, pose, and movement information. Identifying such information may involve applying a content recognition algorithm to visual media. For instance, a recognition algorithm may be applied to an image, a video frame, one or more images in a multi-view of an object, or a stream of video frames. The specific techniques used to identify content, structure, pose, and movement information may depend on the particular implementation. For instance, skeleton detection and tracking may be used to identify content, structure, pose, or movement information.

After analyzing the visual digital media item, one or more visual digital media modifications to present are selected at 508. According to various embodiments, one or more specific filters may be selected based on the content and/or context of the scene depicted in the visual digital media content. That is, the identification of objects such as cars, food or people, or the identification of semantic areas such as sky, grass, water may trigger the selection, recommendation, and/or application of specific filters. For example, if a car is present in the captured scene and is detected, then car-specific filters such as stickers, exhaust fumes, and other types of augmented reality modifications may be made available. As another example, if a person is present in the scene then filters specific for humans may be added, such as speech bubbles. As still another example, filters may be selected that apply to particular contexts, such as fashion shots or sporting events. For some objects, such as people and vehicles, poses and movements may also be used to trigger filters. If multiple objects are present, such as both a person and a vehicle, then filters may be selected that are specific to the combination of objects, instead of or in addition to filters that are specific to only persons or only vehicles.

In some implementations, one or more of a variety of context-specific filters may be selected. In one example, certain filters may be selected for certain objects. For instance, vehicles may be modified to include stickers, color changes, motion blur, or other such vehicle-specific alterations. In a second example, moving artificial objects may be added that react with the scene structure such as balls that bounce off of the ground, objects that accumulate on the ground, weather patterns such as rain or snow that interact with the scenery, artificial light sources that are blocked by objects in the scene, or other such alterations. In a third example, an artificial object may be automatically positioned relative to the scene and/or objects. Specific examples of inserting virtual objects include, but are not limited to: 3D text bubbles appearing next to a human's face, "vroom" text appearing near a car's engine, or hats or clothing being placed on humans or animals. In a fourth example, a filter may change the color of the sky or alter the "style" of a visual digital media item. For instance, the style may be altered to appear cartoonish or retro.

In some embodiments, effects and filters may be added based on a detected pose. In one example, if a person is detected in a particular pose, then a filter may be selected that will cause a laser beam or fire to shoot from the person's hands. In a second example, if multiple people are detected close to one another, then effects or elements which correlate both people can be added, such as hearts indicating affection. In a third example, if a person is detected, then the person can be cut out of the scene and pasted in one or more times in a different position or pose, such as dancing. In a fourth example, parts of a human body can be replaced. For instance, a head may be replaced with an apple, a crocodile head, or some other object. In a fifth example, the context can be changed. For instance, when a person is detected as jumping, a filter may be applied to depict alligators or some other hazard beneath the person. In a sixth example, elements can be added that interact with a person. For instance, a snake can be added that moves up a person's body, or lightning can be added that traverses a person's body. An infinite variety of such alterations is possible. In a seventh example, a person may be cut or copied from a scene and then pasted in again with the same pose, potentially multiple times. For instance, a dancing person may be replicated to produce a group of dancing people. In an eighth example, pre-recorded cutouts of other people may be added to a scene. For instance, one or more video cutouts of a dancing celebrity or friend may be added to a scene to make a person appear to be dancing with others.

According to various embodiments, visual digital media modifications may be selected based at least in part on explicit classifications or categorizations. For instance, a user or system administrator may specifically identify a particular type of modification as pertaining to a vehicle, a person, or both. Alternately, or additionally, visual digital media modifications may be selected based at least in part on implicit or machine-generated classifications or categorizations. For instance, the system may analyze user selections to help determine which modifications to suggest for which visual digital media items.

Once the one or more visual digital media modifications are selected, at 510 the selections are provided for presentation in a user interface. According to various embodiments, the specific technique for providing the selections for presentation may depend in part on the specific implementation. For instance, if the analysis is performed at a server, then providing the selections for presentation may involve transmitting a message to a client device with instructions for presenting the selections in a user interface at the client device. Alternately, if the analysis is performed at a client device, then the selections may be presented directly in a user interface.

Then, a determination is made at 512 as to whether to continue to analyze the visual digital media item. According to various embodiments, analysis may continue until one or more conditions or criteria are met. These may include, but are not limited to: the receipt of user input indicating a request to stop analysis, the selection of a particular filter or filters for presentation, and the termination of a live or prerecorded media stream.

Figure 6:
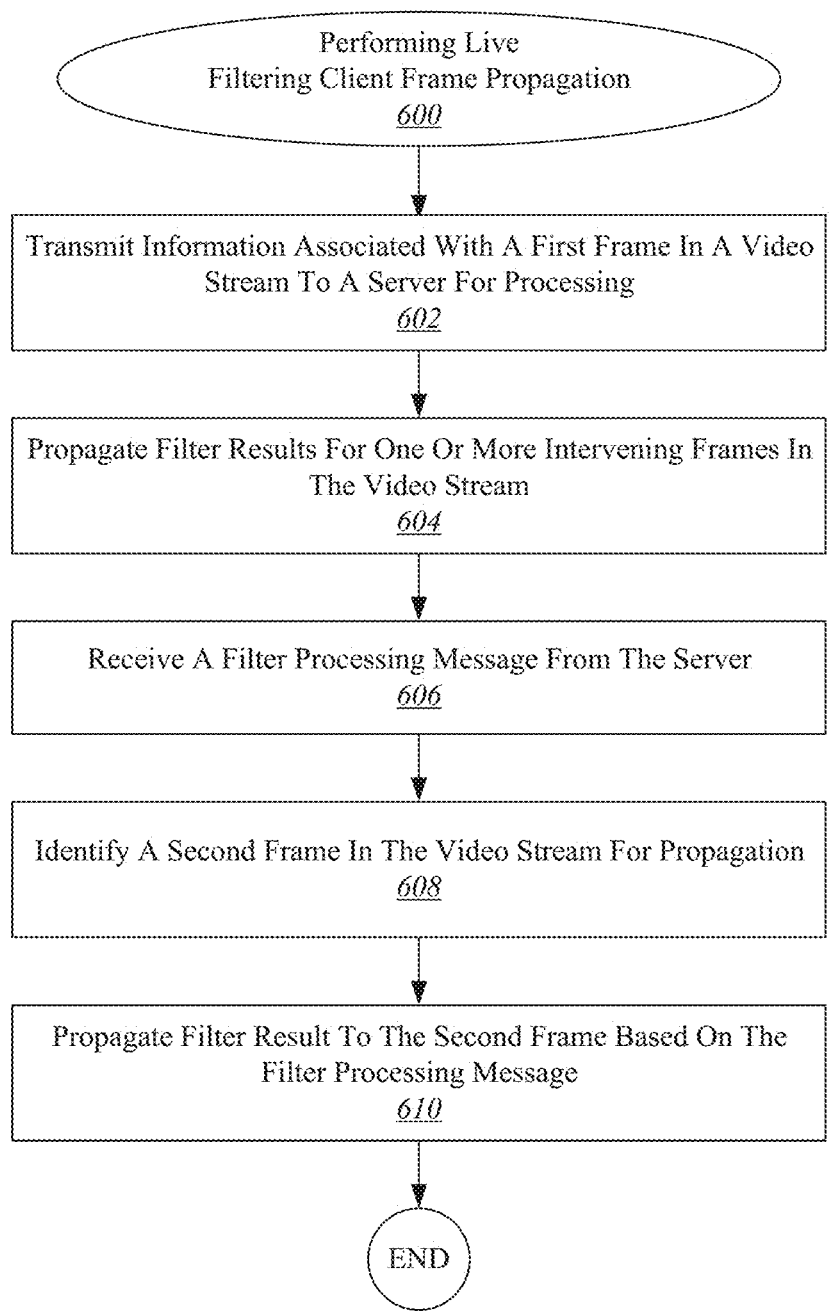
FIG. 6 illustrates one example of a procedure for propagating information across successive frames in a video stream during skeleton detection and tracking.

With reference to FIG. 6, shown is an example of a procedure for propagating information across successive frames in a video stream during live filtering. For instance, the procedure 600 may be used for skeleton tracking. In the procedure 600, information associated with a first frame in a video stream is transmitted to a server for processing at 602. Then, at 604, the information is propagated for one or more intervening frames in the video stream.

As discussed herein, propagation may involve any of a variety of techniques, depending on the particular implementation. One such approach is frame-to-frame tracking, which can be based on information that may include, but is not limited to: racking of sparse keypoints, dense or sparse optical flow, patch tracking, tracking of geometric instances, or other such information. Another such approach is frame-to-frame matching, which involve techniques that may include, but are not limited to: descriptor based matching of keypoints which are detected in both frames, patch matching, detection and matching of higher level features (e.g. a human face), or other such techniques. Both approaches can focus the tracking and matching efforts on regions or features of interest if such regions or features are identified.

For example, the client device may be configured to identify features associated with the frames such as points or areas. A point may correspond, for instance, with an elbow, a table corner, a nose, or some other such physical object. An area may correspond, for instance, with a shirt, a table surface, a face, or some other such physical area of interest. The client device may be configured to identify such features in each frame. Then, the client device may construct a correspondence between successive frames. For instance, one or more points or areas may be located at similar locations across successive frames. Further, motion across successive frames may be tracked by detecting trajectories of points or areas across successive frames.

In some implementations, high-level features identified by the server may be tracked by tracking lower-level features capable of being identified by the client device. For example, the server may indicate that a particular constellation of points or an area of color represents a face, and that a speech bubble is to be located next to the face. Then, the client device may track the constellation of points or area of color over successive frames and move the speech bubble as necessary to hold its position relative to the face.

After propagating the filter results for one or more intervening frames, at 606 a filter processing message is received from the server. Then, a second frame in the video stream is identified for propagation at 608. According to various embodiments, the second frame may be the next suitable frame available for processing after the receipt of the filter processing message. Finally, at 610, filter results are propagated to the second frame based on the filter processing message.

In some implementations, the filter results may be propagated from the preceding frame to the second frame in much the same way as discussed with respect to operation 604. In other implementations, the filter results may be propagated directly from an earlier frame, such as the frame associated with the request message that gave rise to the filter processing message received at 606. Of course, the example configuration and procedures shown herein depict only a limited number of frames. In order to show a continuous filtered live video stream, the procedures may be repeated as needed until live filtering is terminated.

Figure 7:
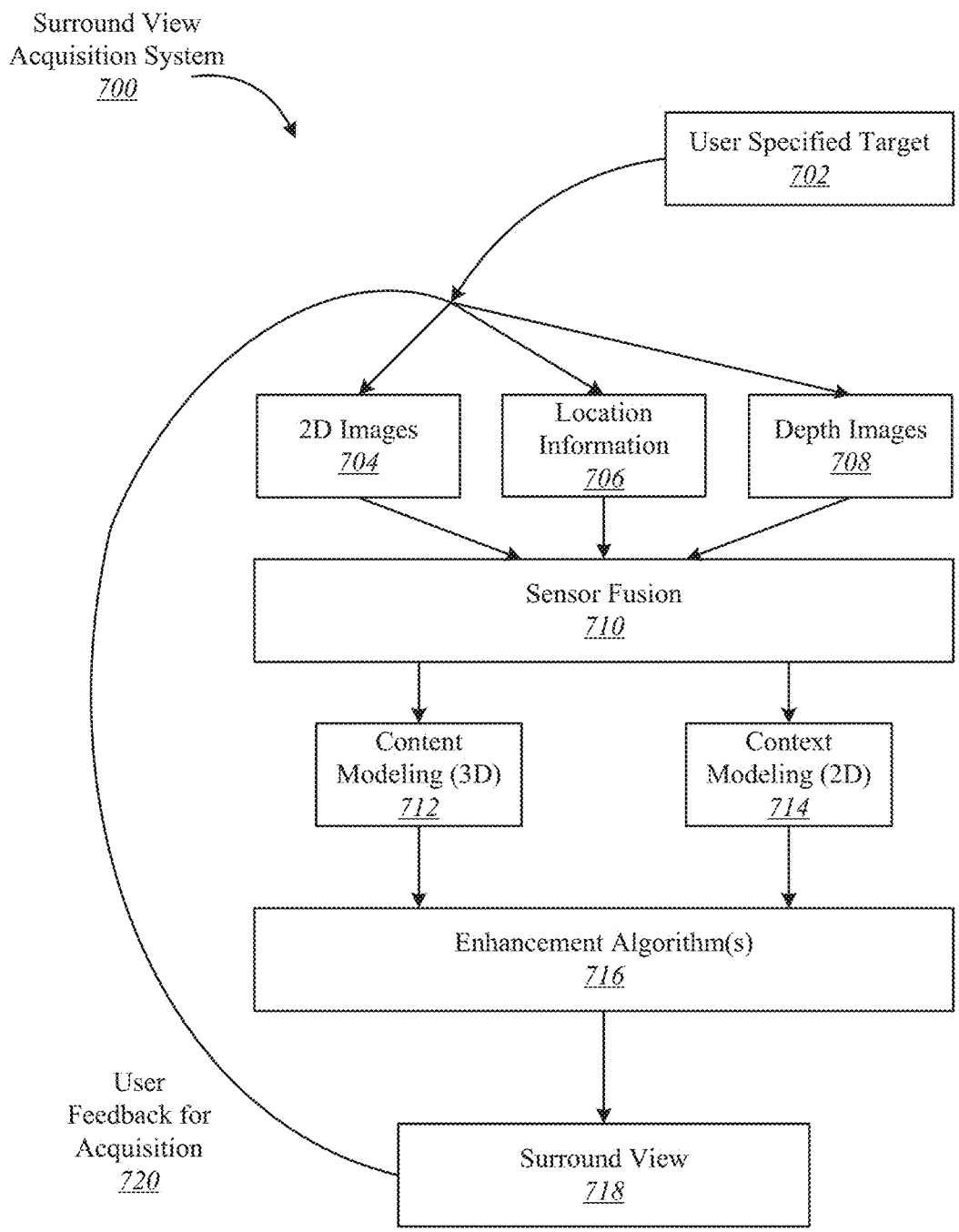
FIG. 7 illustrates an example of a surround view acquisition system.

With reference to FIG. 7, shown is an example of a surround view acquisition system that can be used to generate a multi-view interactive digital media representation that can be used for skeleton detection and tracking and/or the application of filters or visual effects. A multi-view interactive digital media representation includes much more information than a single image. Whereas a single image may include information such as a grid of color pixels and the date/time of capture, a multi-view interactive digital media representation includes information such as such as grids of color pixels, date/time of capture, spatial information (flow/3D), location, and inertial measurement unit information (IMU) (i.e., compass, gravity, orientation). A multi-view interactive digital media representation brings focus to an object of interest because it provides separation between the foreground and background. In addition, a multi-view interactive digital media representation provides more information about the scale, context, and shape of the object of interest. Furthermore, by providing multiple views, aspects of the object that are not visible from a single view can be provided in a multi-view interactive digital media representation.

In the present example embodiment, the surround view acquisition system 700 is depicted in a flow sequence that can be used to generate a surround view. According to various embodiments, the data used to generate a surround view can come from a variety of sources. In particular, data such as, but not limited to two-dimensional (2D) images 704 can be used to generate a surround view. These 2D images can include color image data streams such as multiple image sequences, video data, etc., or multiple images in any of various formats for images, depending on the application. Another source of data that can be used to generate a surround view includes location information 706. This location information 706 can be obtained from sources such as accelerometers, gyroscopes, magnetometers, GPS, Wi-Fi, IMU-like systems (Inertial Measurement Unit systems), and the like. Yet another source of data that can be used to generate a surround view can include depth images 708. These depth images can include depth, 3D, or disparity image data streams, and the like, and can be captured by devices such as, but not limited to, stereo cameras, time-of-flight cameras, three-dimensional cameras, and the like.

In the present example embodiment, the data can then be fused together at sensor fusion block 710. In some embodiments, a surround view can be generated a combination of data that includes both 2D images 704 and location information 706, without any depth images 708 provided. In other embodiments, depth images 708 and location information 706 can be used together at sensor fusion block 710. Various combinations of image data can be used with location information at 706, depending on the application and available data.

In the present example embodiment, the data that has been fused together at sensor fusion block 710 is then used for content modeling 711 and context modeling 714. During this process, the subject matter featured in the images can be separated into content and context. The content can be delineated as the object of interest and the context can be delineated as the scenery surrounding the object of interest. According to various embodiments, the content can be a three-dimensional model, depicting an object of interest, although the content can be a two-dimensional image in some embodiments. Furthermore, in some embodiments, the context can be a two-dimensional model depicting the scenery surrounding the object of interest. Although in many examples the context can provide two-dimensional views of the scenery surrounding the object of interest, the context can also include three-dimensional aspects in some embodiments. For instance, the context can be depicted as a "flat" image along a cylindrical "canvas," such that the "flat" image appears on the surface of a cylinder. In addition, some examples may include three-dimensional context models, such as when some objects are identified in the surrounding scenery as three-dimensional objects. According to various embodiments, the models provided by content modeling 711 and context modeling 714 can be generated by combining the image and location information data.

According to various embodiments, context and content of a surround view are determined based on a specified object of interest. In some examples, an object of interest is automatically chosen based on processing of the image and location information data. For instance, if a dominant object is detected in a series of images, this object can be selected as the content. In other examples, a user specified target 702 can be chosen. It should be noted, however, that a surround view can be generated without a user specified target in some applications.

In the present example embodiment, one or more enhancement algorithms can be applied at enhancement algorithm(s) block 716. In particular example embodiments, various algorithms can be employed during capture of surround view data, regardless of the type of capture mode employed. These algorithms can be used to enhance the user experience. For instance, automatic frame selection, stabilization, view interpolation, filters, and/or compression can be used during capture of surround view data. In some examples, these enhancement algorithms can be applied to image data after acquisition of the data. In other examples, these enhancement algorithms can be applied to image data during capture of surround view data.

According to particular example embodiments, automatic frame selection can be used to create a more enjoyable surround view. Specifically, frames are automatically selected so that the transition between them will be smoother or more even. This automatic frame selection can incorporate blur- and overexposure-detection in some applications, as well as more uniformly sampling poses such that they are more evenly distributed.

In some example embodiments, stabilization can be used for a surround view in a manner similar to that used for video. In particular, key frames in a surround view can be stabilized to produce improvements such as smoother transitions, improved/enhanced focus on the content, etc. However, unlike video, there are many additional sources of stabilization for a surround view, such as by using IMU information, depth information, computer vision techniques, direct selection of an area to be stabilized, face detection, and the like.

For instance, IMU information can be very helpful for stabilization. In particular, IMU information provides an estimate, although sometimes a rough or noisy estimate, of the camera tremor that may occur during image capture. This estimate can be used to remove, cancel, and/or reduce the effects of such camera tremor.

In some examples, depth information, if available, can be used to provide stabilization for a surround view. Because points of interest in a surround view are three-dimensional, rather than two-dimensional, these points of interest are more constrained and tracking/matching of these points is simplified as the search space reduces. Furthermore, descriptors for points of interest can use both color and depth information and therefore, become more discriminative. In addition, automatic or semi-automatic content selection can be easier to provide with depth information. For instance, when a user selects a particular pixel of an image, this selection can be expanded to fill the entire surface that touches it. Furthermore, content can also be selected automatically by using a foreground/background differentiation based on depth. In various examples, the content can stay relatively stable/visible even when the context changes.

According to various examples, computer vision techniques can also be used to provide stabilization for surround views. For instance, key points can be detected and tracked. However, in certain scenes, such as a dynamic scene or static scene with parallax, no simple warp exists that can stabilize everything. Consequently, there is a trade-off in which certain aspects of the scene receive more attention to stabilization and other aspects of the scene receive less attention. Because a surround view is often focused on a particular object of interest, a surround view can be content-weighted so that the object of interest is maximally stabilized in some examples.

Another way to improve stabilization in a surround view includes direct selection of a region of a screen. For instance, if a user taps to focus on a region of a screen, then records a convex surround view, the area that was tapped can be maximally stabilized. This allows stabilization algorithms to be focused on a particular area or object of interest.

In some examples, face detection can be used to provide stabilization. For instance, when recording with a front-facing camera, it is often likely that the user is the object of interest in the scene. Thus, face detection can be used to weight stabilization about that region. When face detection is precise enough, facial features themselves (such as eyes, nose, mouth) can be used as areas to stabilize, rather than using generic key points.

According to various examples, view interpolation can be used to improve the viewing experience. In particular, to avoid sudden "jumps" between stabilized frames, synthetic, intermediate views can be rendered on the fly. This can be informed by content-weighted key point tracks and IMU information as described above, as well as by denser pixel-to-pixel matches. If depth information is available, fewer artifacts resulting from mismatched pixels may occur, thereby simplifying the process. As described above, view interpolation can be applied during capture of a surround view in some embodiments. In other embodiments, view interpolation can be applied during surround view generation.

In some examples, filters can also be used during capture or generation of a surround view to enhance the viewing experience. Just as many popular photo sharing services provide aesthetic filters that can be applied to static, two-dimensional images, aesthetic filters can similarly be applied to surround images. However, because a surround view representation is more expressive than a two-dimensional image, and three-dimensional information is available in a surround view, these filters can be extended to include effects that are ill-defined in two dimensional photos. For instance, in a surround view, motion blur can be added to the background (i.e. context) while the content remains crisp. In another example, a drop-shadow can be added to the object of interest in a surround view.

In various examples, compression can also be used as an enhancement algorithm 716. In particular, compression can be used to enhance user-experience by reducing data upload and download costs. Because surround views use spatial information, far less data can be sent for a surround view than a typical video, while maintaining desired qualities of the surround view. Specifically, the IMU, key point tracks, and user input, combined with the view interpolation described above, can all reduce the amount of data that must be transferred to and from a device during upload or download of a surround view. For instance, if an object of interest can be properly identified, a variable compression style can be chosen for the content and context. This variable compression style can include lower quality resolution for background information (i.e. context) and higher quality resolution for foreground information (i.e. content) in some examples. In such examples, the amount of data transmitted can be reduced by sacrificing some of the context quality, while maintaining a desired level of quality for the content.

In the present embodiment, a surround view 718 is generated after any enhancement algorithms are applied. The surround view can provide a multi-view interactive digital media representation. In various examples, the surround view can include three-dimensional model of the content and a two-dimensional model of the context. However, in some examples, the context can represent a "flat" view of the scenery or background as projected along a surface, such as a cylindrical or other-shaped surface, such that the context is not purely two-dimensional. In yet other examples, the context can include three-dimensional aspects.

According to various embodiments, surround views provide numerous advantages over traditional two-dimensional images or videos. Some of these advantages include: the ability to cope with moving scenery, a moving acquisition device, or both; the ability to model parts of the scene in three-dimensions; the ability to remove unnecessary, redundant information and reduce the memory footprint of the output dataset; the ability to distinguish between content and context; the ability to use the distinction between content and context for improvements in the user-experience; the ability to use the distinction between content and context for improvements in memory footprint (an example would be high quality compression of content and low quality compression of context); the ability to associate special feature descriptors with surround views that allow the surround views to be indexed with a high degree of efficiency and accuracy; and the ability of the user to interact and change the viewpoint of the surround view. In particular example embodiments, the characteristics described above can be incorporated natively in the surround view representation, and provide the capability for use in various applications. For example, surround views can be used in applying filters or visual effects. As another example, skeletons can be detected and tracked in surround views.

According to various example embodiments, once a surround view 718 is generated, user feedback for acquisition 720 of additional image data can be provided. In particular, if a surround view is determined to need additional views to provide a more accurate model of the content or context, a user may be prompted to provide additional views. Once these additional views are received by the surround view acquisition system 700, these additional views can be processed by the system 700 and incorporated into the surround view.

Figure 8:
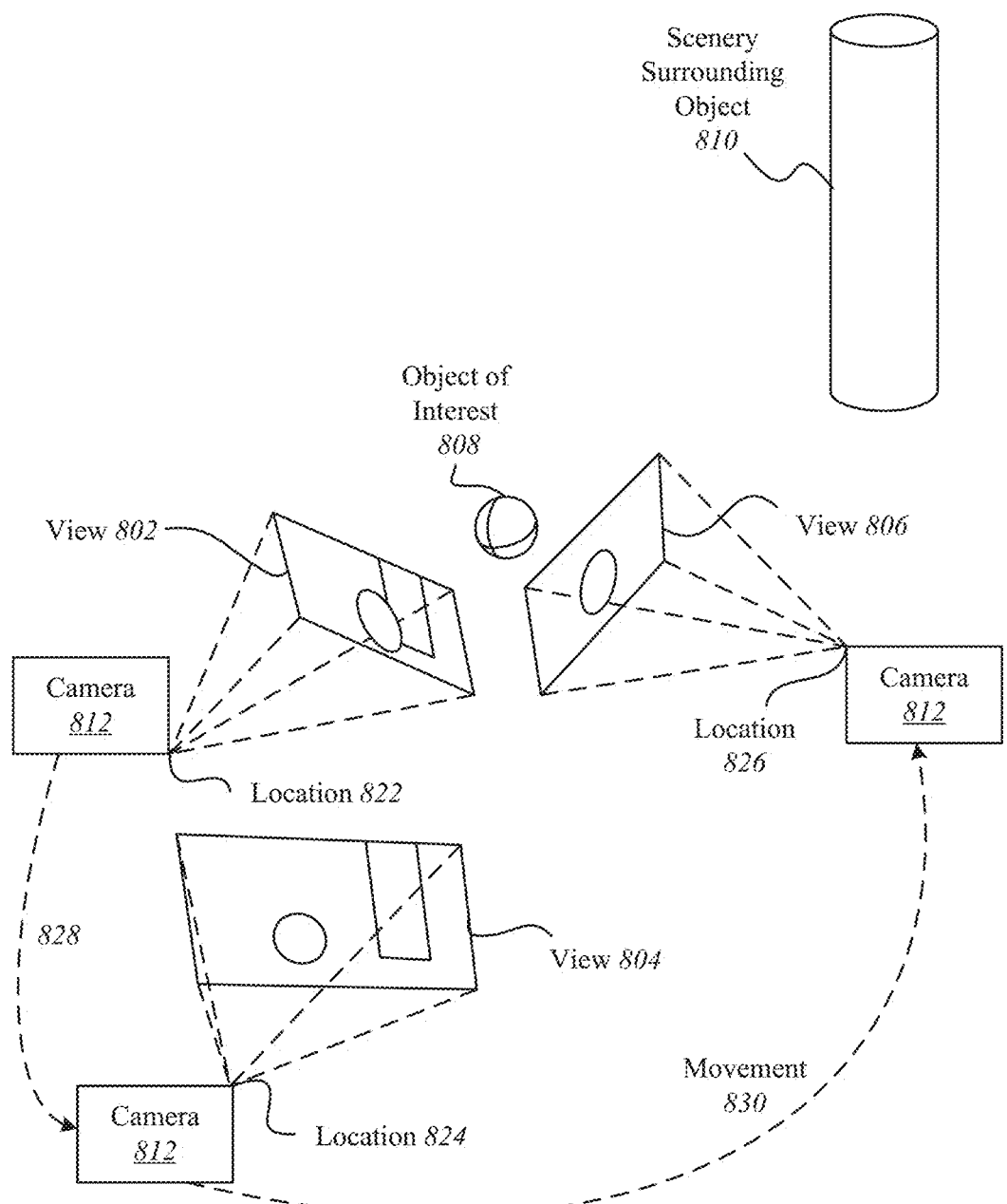
FIG. 8 illustrates an example of a device capturing multiple views of an object of interest from different locations during a skeleton detection and tracking session.

With reference to FIG. 8, shown is an example of a device capturing multiple views of an object of interest from different locations. The capture device is indicated as camera 811, and moves from location 822 to location 824 and from location 824 to location 826. The multiple camera views 802, 804, and 806 captured by camera 811 can be fused together into a three-dimensional (3D) model. According to various embodiments, multiple images can be captured from various viewpoints and fused together to provide a multi-view digital media representation.

In the present example embodiment, camera 811 moves to locations 822, 824, and 826, respectively, along paths 828 and 830, in proximity to an object of interest 808. Scenery can surround the object of interest 808 such as object 88. Views 802, 804, and 806 are captured by camera 811 from locations 822, 824, and 826 and include overlapping subject matter. Specifically, each view 802, 804, and 806 includes the object of interest 808 and varying degrees of visibility of the scenery surrounding the object 810. For instance, view 802 includes a view of the object of interest 808 in front of the cylinder that is part of the scenery surrounding the object 808. View 804 shows the object of interest 808 to one side of the cylinder, and view 806 shows the object of interest without any view of the cylinder.

In the present example embodiment, the various views 802, 804, and 806 along with their associated locations 822, 824, and 826, respectively, provide a rich source of information about object of interest 808 and the surrounding context that can be used to produce a multi-view digital media representation, such as a surround view. For instance, when analyzed together, the various views 802, 804, and 806 provide information about different sides of the object of interest and the relationship between the object of interest and the scenery. These views also provide information about the relative size and scale of the object of interest in relation to the scenery. Furthermore, views from different sides of the object provide information about the shape and texture of the object. According to various embodiments, this information can be used to parse out the object of interest 808 into content and the scenery 88 as the context. In particular examples, the content can then be used for detecting and tracking skeletons and/or applying filters.

Figure 9:
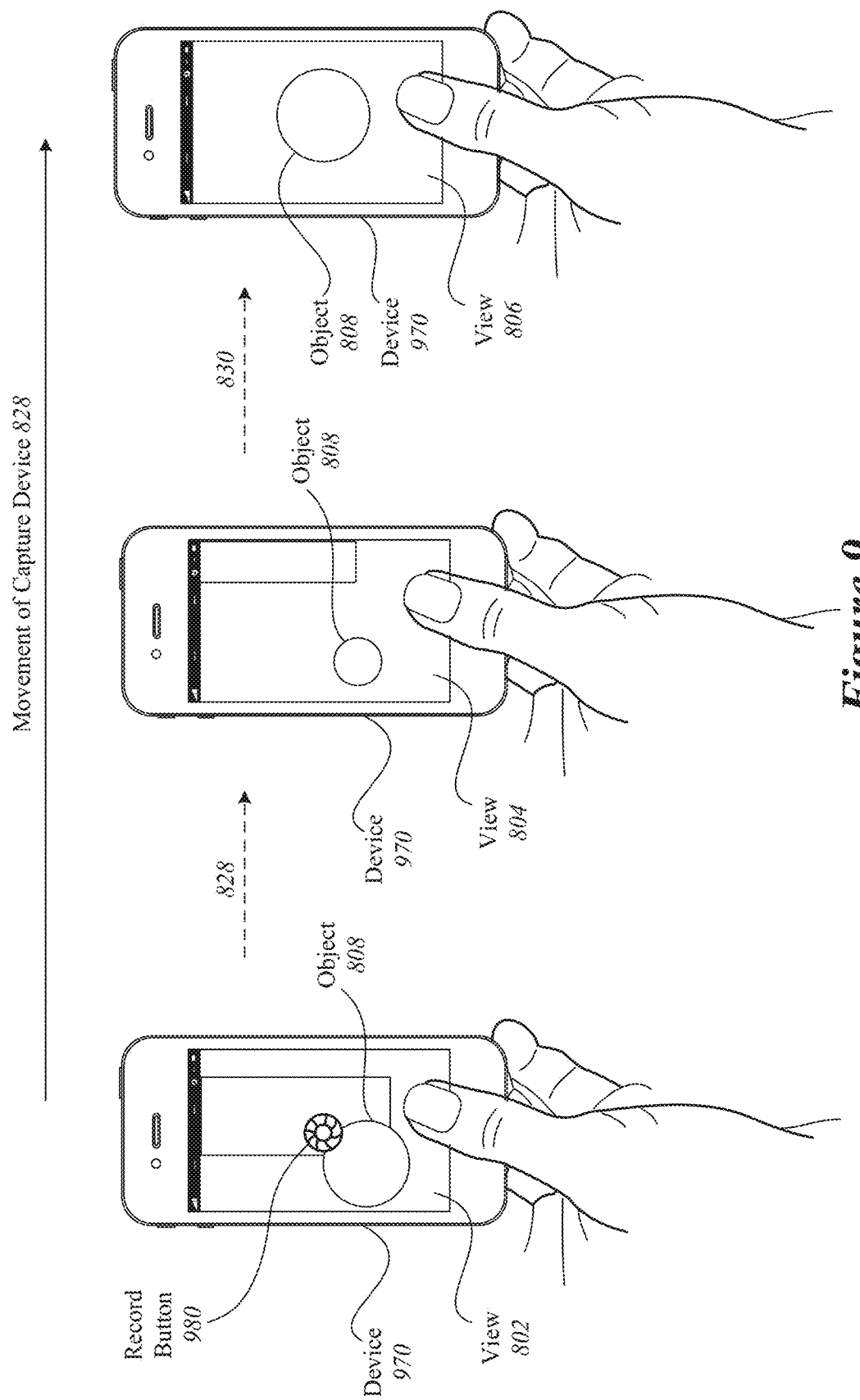
FIG. 9 illustrates an example of a device capturing views of an object of interest during a skeleton detection and tracking session.

With reference to FIG. 9, shown is an example of a device capturing views of an object of interest. During a filter session, multiple views of the object 908 may be captured by the device 970 from different locations. In the present example, data is acquired when a user taps a record button 980 on capture device 970 to begin recording images of the object.

The user moves 828 the capture device 970 from location 822 to location 824 along path 828 and from location 824 to location 826 along path 830. As described in more detail throughout this application, filtering can be provided at the device 970, and prompts for the user to capture particular views can be provided during the session. In particular, the system can prompt the user to move the device 970 in a particular direction or may prompt the user to provide additional information. As the user records different views of the object, filtering suggestions may be reiteratively refined to provide accurate results. The user may choose to stop recording by tapping the record button 980 again. In other examples, the user can tap and hold the record button during the session, and release to stop recording. In the present embodiment, the recording captures a series of images that can be used to generate a multi-view digital media representation that can be for filtering either in real-time or after-the-fact.

In some implementations, applying a filter to a multi-view digital media representation may involve processing a succession of images taken from different perspectives. In such an example, the client device may perform low-level processing such as two-dimensional analysis of individual images. The server, on the other hand, may perform high-level processing such as combining different individual images to produce a three-dimensional model of an object that is the subject of a multi-view video.

Figure 10:
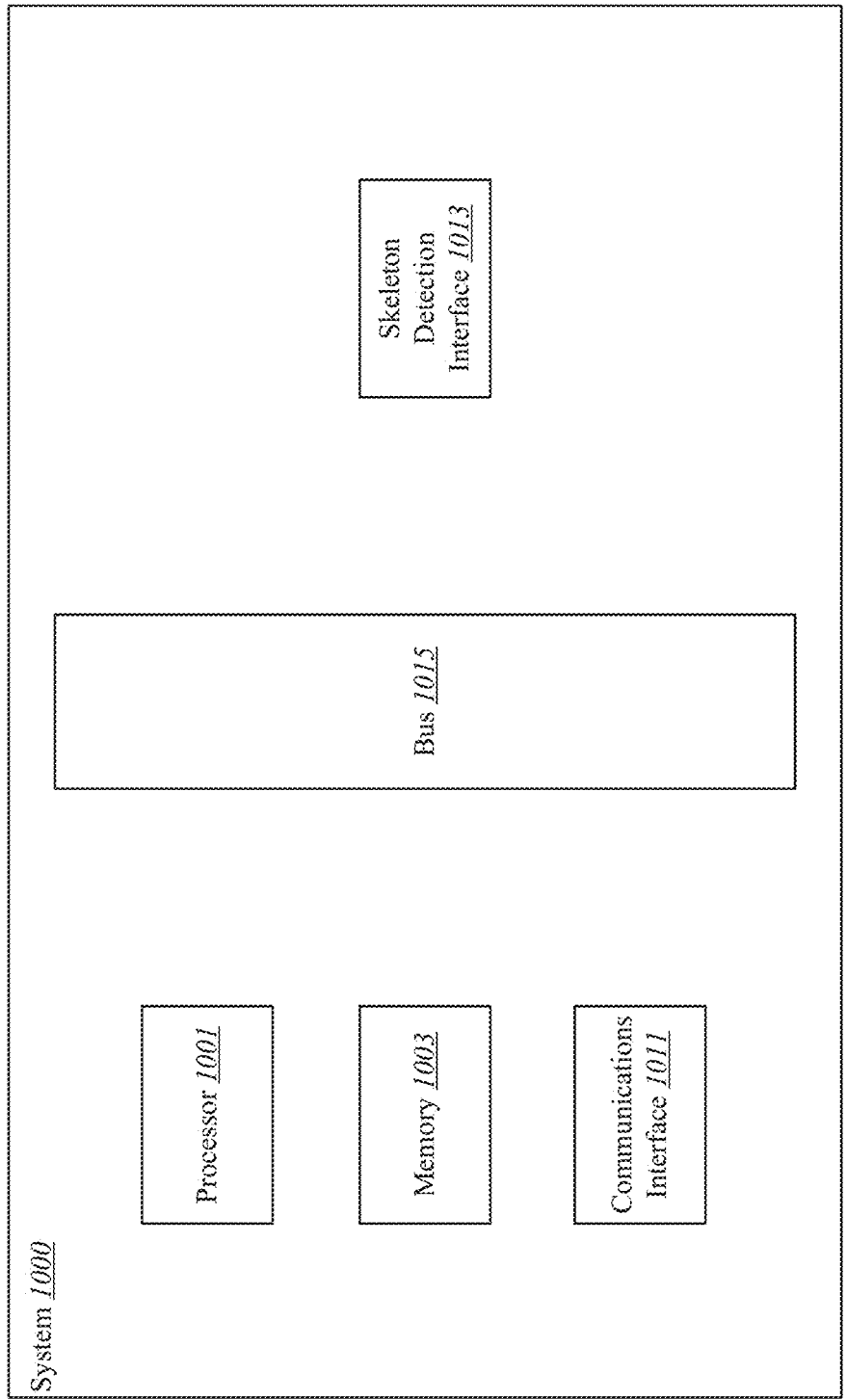
FIG. 10 illustrates a particular example of a computer system that can be used with various embodiments of the present invention.

With reference to FIG. 10, shown is a particular example of a computer system that can be used to implement particular examples of the present invention. For instance, the computer system 1000 can be used to perform skeleton detection and tracking using client-server communications according to various embodiments described above. According to particular example embodiments, a system 1000 suitable for implementing particular embodiments of the present invention includes a processor 1001, a memory 1003, skeleton detection interface 1013, and a bus 1015 (e.g., a PCI bus). The skeleton detection interface 1013 may include separate input and output interfaces, or may be a unified interface supporting both operations. When acting under the control of appropriate software or firmware, the processor 1001 is responsible for such tasks such as optimization. Various specially configured devices can also be used in place of a processor 1001 or in addition to processor 1001. The complete implementation can also be done in custom hardware. The live filter interface 1010 is typically configured to send and receive data packets or data segments over a network. Particular examples of interfaces the device supports include Ethernet interfaces, frame relay interfaces, cable interfaces, DSL interfaces, token ring interfaces, and the like.

In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management.

According to particular example embodiments, the system 1000 uses memory 1003 to store data and program instructions and maintained a local side cache. The program instructions may control the operation of an operating system and/or one or more applications, for example. The memory or memories may also be configured to store received metadata and batch requested metadata.

Because such information and program instructions may be employed to implement the systems/methods described herein, the present invention relates to tangible, machine readable media that include program instructions, state information, etc. for performing various operations described herein. Examples of machine-readable media include hard disks, floppy disks, magnetic tape, optical media such as CD-ROM disks and DVDs; magneto-optical media such as optical disks, and hardware devices that are specially configured to store and perform program instructions, such as read-only memory devices (ROM) and programmable read-only memory devices (PROMs). Examples of program instructions include both machine code, such as produced by a compiler, and files containing higher level code that may be executed by the computer using an interpreter.

Figure 11:
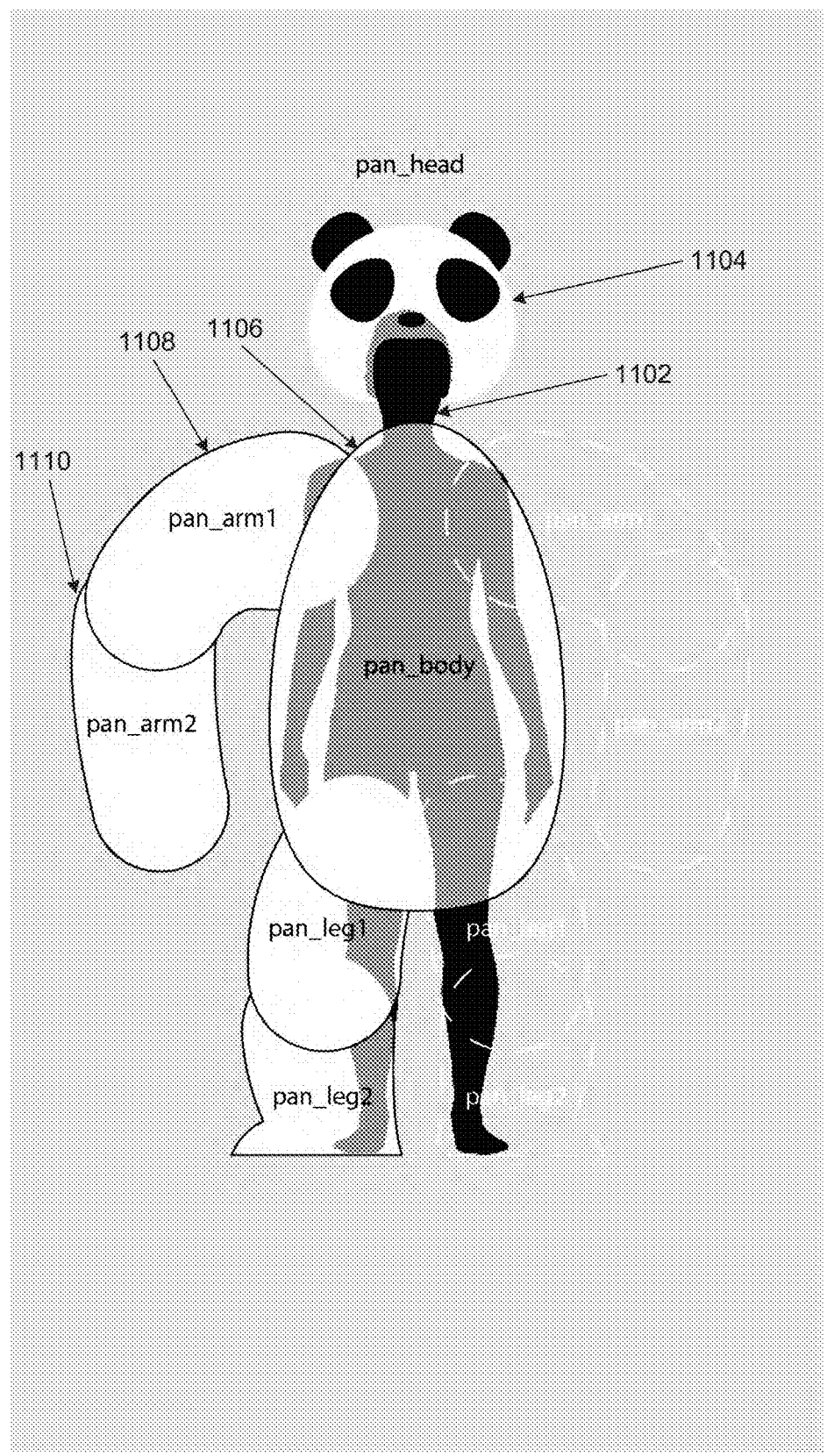
FIG. 11 illustrates a particular example of a diagram illustrating the replacement of body parts.

With reference to FIG. 11, shown is a particular example of a diagram illustrating the replacement of body parts. FIG. 11 includes an outline of a person at 1102, which represents an abstraction that may be drawn from a video frame or static image. For instance, a skeleton detection or tracking algorithm may estimate the location of a person's body parts to determine a pose. After skeleton detection and/or tracking is performed, one or more of the person's body parts may be replaced with an alternative body part to make the person appear physically different while exhibiting the same or similar pose. For instance, in the example shown in FIG. 11 the person's corresponding body parts may be replaced with a panda head 1104, a panda body 1106, a panda upper arm 1108, and a panda lower arm 1110.

According to various embodiments, a potentially infinite variety of filters or modifications may be applied to digital media content. Although various examples have been described elsewhere in this application, some additional examples are provided here to provide additional context. When a person is detected with arms outstretched, visual elements such as angel wings, bat wings, butterfly wings, plane wings and engines, or a jetpack with exhaust fumes may be added. When a person is detected in a leaning posture, visual elements such as a dinosaur tail, a squirrel tail, or a raccoon tail may be added. When a person is detecting standing with hands on hips, visual elements may be added to replace the person's clothing with a superhero costume or to add a cape to the person's existing attire. When a person is detected as yelling, for instance with hands cupped around the mouth, visual elements may be added to depict a megaphone, flames, or a speech bubble near the person's mouth. Depending on a person's pose, visual elements may be added to replace a person's clothing or depict a person's body as a skeleton. When a person is detected as standing in a body builder's pose, the person's body may be replaced with one exhibiting more muscles or deformed to appear to exhibit more muscles. When a person is detected as having a hand over a mouth, visual elements may be added to make the person appear to be underwater as a scuba diver or mermaid. When a person is detect as leaning forward in a flying position, visual elements may be added to make the person appear to be a flying angel or super hero. For instance, a person's legs may be moved to make the person appear to be not supported by the ground. When a person is detected with arms uplifted, visual elements may be added to cause rainbows, money, or angels to appear over the person. When a person is detected with hands arranged in a boxing pose, visual elements may be added to make the person appear to be wearing boxing gloves or holding a weapon. A person's facial features or body may be modified to make the person appear to have the head or body of an animal, a fruit, a robot, or some other such object. A person's facial features may be detected and then used to select a corresponding emoticon, which then may be used to replace the person's head. When a person is detected as walking a dog, the dog's head and the person's head may be swapped. A person may be made to appear much thinner, heavier, more muscular, less muscular, or wavier than in reality. Motion blur may be added to make a person appear to be spinning very quickly. The preceding examples provide additional context about the types of visual modifications that could be made, but a potentially infinite variety of visual modifications may be provided according to various embodiments.

Although particular features have been described as part of each example in the present disclosure, any combination of these features or additions of other features are intended to be included within the scope of this disclosure. Accordingly, the embodiments described herein are to be considered as illustrative and not restrictive. Furthermore, although many of the components and processes are described above in the singular for convenience, it will be appreciated by one of skill in the art that multiple components and repeated processes can also be used to practice the techniques of the present disclosure.

While the present disclosure has been particularly shown and described with reference to specific embodiments thereof, it will be understood by those skilled in the art that changes in the form and details of the disclosed embodiments may be made without departing from the spirit or scope of the invention. Specifically, there are many alternative ways of implementing the processes, systems, and apparatuses described. It is therefore intended that the invention be interpreted to include all variations and equivalents that fall within the true spirit and scope of the present invention.

What is claimed is:

1. A method comprising:
   receiving a raw video stream generated based on ambient visible light data collected by a camera operating at a smartphone;
   transmitting from the smartphone to a remote server a first skeleton detection request message including a first video frame identified by preprocessing the raw video stream at the smartphone;
   receiving from the remote server via a network interface at the smartphone a first skeleton detection message including first position data for a skeleton representing a structure of the object;
   based on the first position data, determining intervening position data for the skeleton in one or more intervening video frames in the raw video stream via a processor at the smartphone, wherein the one or more intervening video frames are temporally located after the first video frame in the raw video stream; and
   presenting a filtered video stream live at the smartphone by altering the raw video stream based at least in part on the first position data and the intervening position data.

2. The method recited in claim 1, the method further comprising:
   receiving from the remote server a second skeleton detection message, the second skeleton detection message including second position data for the skeleton representing the structure of the object depicted in a second video frame in the raw video stream, wherein the second video frame is temporally located after the one or more intervening video frames.

3. The method recited in claim 1, the method further comprising:
   identifying pose information associated with the object based on the first position data or the intervening position data, wherein the pose information indicates a stance or positioning of the object, wherein the raw video stream is altered based at least in part on the pose information.

4. The method recited in claim 1, wherein the object is an item selected from the group consisting of: a human, an animal, and a vehicle.

5. The method recited in claim 1, wherein the object is a person, and wherein altering the raw video stream includes introducing a modification selected from the group consisting of: a text bubble appearing in proximity to the person's face, lightning traveling through the person's body, a fireball shooting out of the person's hands, and a fireball hovering near the person's hands.

6. The method recited in claim 1, wherein altering the raw video stream includes introducing an artificial item into the filtered video stream or introducing motion blur indicating movement associated with the object.

7. The method recited in claim 1, wherein presenting the filtered video stream comprises animating an augmented reality or virtual reality object based on the intervening position data.

8. The method recited in claim 1, wherein the filtered video stream is presented at an augmented reality or virtual reality device in communication with the smart phone.

9. The method recited in claim 1, wherein the raw video stream includes spatial information selected from the group consisting of: depth information, visual flow between a plurality of viewpoints, and three-dimensional location information.

10. The method recited in claim 1, wherein the raw video stream includes scale information estimated using accelerometer information or inertial measurement unit (IMU) data.

11. A computing device comprising:
    a camera at a smartphone operable to generate a raw video stream based on ambient visible light data collected by the camera, the raw video stream being preprocessed at the smartphone to identify a first video frame, the first video frame being transmitted to a remote server in a first skeleton detection request message;

a communications interface operable to receive from the remote server a first skeleton detection message, the first skeleton detection message including first position data for a skeleton representing a structure of an object depicted in the first video frame;

a processor operable to determine intervening position data for the skeleton in one or more intervening video frames in the raw video stream based on the first position data, wherein the one or more intervening video frames are temporally located after the first video frame in the raw video stream; and a display screen operable to present a filtered video stream live at the smartphone by altering the raw video stream based at least in part on the first position data and the intervening position data.

12. The computing device recited in claim 11, wherein the communications interface is further operable to receive from the remote server a second skeleton detection message, the second skeleton detection message including second position data for the skeleton representing the structure of the object depicted in a second video frame in the raw video stream, wherein the second video frame is temporally located after the one or more intervening video frames.

13. The computing device recited in claim 11, wherein the processor is further operable to identify pose information associated with the object based on the first position data or the intervening position data, wherein the pose information indicates a stance or positioning of the object, wherein the raw video stream is altered based at least in part on the pose information.

14. The computing device recited in claim 11, wherein the object is a human, and wherein altering the raw video stream includes introducing a text bubble appearing in proximity to a human face.

15. The computing device recited in claim 11, wherein the raw video stream includes spatial information selected from the group consisting of: depth information, visual flow between a plurality of viewpoints, and three-dimensional location information, and wherein the raw video stream includes scale information estimated using accelerometer information or inertial measurement unit (IMU) data.

16. The computing device recited in claim 11, wherein the object is an item selected from the group consisting of: a human, an animal, and a vehicle.

17. One or more non-transitory computer readable media having instructions stored thereon for performing a method, the method comprising:

receiving a raw video stream generated based on ambient visible light data collected by a camera operating at a smartphone;

transmitting from the smartphone to a remote server a first skeleton detection request message including a first video frame identified by preprocessing the raw video stream at the smartphone;

receiving from the remote server via a network interface at the smartphone a first skeleton detection message including first position data for a skeleton representing a structure of the smartphone;

based on the first position data, determining intervening position data for the skeleton in one or more intervening video frames in the raw video stream via a processor at the smartphone, wherein the one or more intervening video frames are temporally located after the first video frame in the raw video stream; and presenting a filtered video stream live at the smart phone by altering the raw video stream based at least in part on the first position data and the intervening position data.

\* \* \* \* \*